US012699465B2

(12) United States Patent     (10) Patent No.:   US 12,699,465 B2

Tran et al.     (45) Date of Patent:   **\*Aug. 4, 2026**

(54) USER AVATAR MOVEMENT CONTROL USING AN AUGMENTED REALITY EYEWEAR DEVICE

(71) Applicant: Snap Inc., Santa Monica, CA (US)

(72) Inventors: Lien Le Hong Tran, Santa Monica, CA (US); William Miles Miller, San Francisco, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/072,500

(22) Filed: Mar. 6, 2025

(65) Prior Publication Data

US 2025/0199627 A1     Jun. 19, 2025

Related U.S. Application Data

(63) Continuation of application No. 18/544,781, filed on Dec. 19, 2023, now Pat. No. 12,271,536, which is a continuation of application No. 17/983,040, filed on Nov. 8, 2022, now Pat. No. 11,893,166.

(51) Int. Cl.
    *G06F 3/0346*     (2013.01)
    *G06F 3/01*     (2006.01)

(52) U.S. Cl.
    CPC ............ *G06F 3/0346* (2013.01); *G06F 3/011* (2013.01)

(58) Field of Classification Search
    CPC ...... A63F 13/211; A63F 13/212; A63F 13/25;
    A63F 13/428; A63F 13/655; A63F 13/22;
    A63F 13/67; G06F 3/011; G06F 3/012;
    G06F 3/0346; G02B 27/0093
    See application file for complete search history.

(56) References Cited

U.S. PATENT DOCUMENTS 12,271,536 B2    4/2025   Tran et al.
2011/0093820 A1*   4/2011   Zhang ..................... A63F 13/22
                                        715/863
2017/0352226 A1*   12/2017   Matsuzawa ............. A63F 13/67

(Continued)

FOREIGN PATENT DOCUMENTS

CN     120167059 A     6/2025
KR     20200096617     8/2020

OTHER PUBLICATIONS

"U.S. Appl. No. 18/544,781, Non Final Office Action mailed Oct. 1, 2024", 8 pgs.

(Continued)

*Primary Examiner* — Richard J Hong
(74) *Attorney, Agent, or Firm* — SCHWEGMAN LUNDBERG & WOESSNER, P.A.

(57) ABSTRACT

Systems and methods are provided for performing operations on an augmented reality (AR) device. The system accesses, by the AR device, movement data comprising inertial measurement data and camera data. The system determines three-dimensional (3D) movement of the AR device based on the movement data. The system presents, by the AR device, an AR object on a real-world environment being viewed using the AR device. The system, in response to determining the 3D movement of the AR device, modifies the AR object by the AR device.

20 Claims, 11 Drawing Sheets

900

(56)     References Cited

U.S. PATENT DOCUMENTS

2021/0255695 A1 *  8/2021  Homma .................. G06F 3/011
2023/0185365 A1 *  6/2023  Rahman ............. G02B 27/0093
                                                      345/156

OTHER PUBLICATIONS

"U.S. Appl. No. 18/544,781, Notice of Allowance mailed Dec. 9, 2024", 10 pgs.
"U.S. Appl. No. 18/544,781, Response filed Nov. 12, 2024 to Non Final Office Action mailed Oct. 1, 2024", 8 pgs.
U.S. Appl. No. 17/983,040 now U.S. Pat. No. 11,893,166, Nov. 8, 2022, User Avatar Movement Control Using an Augmented Reality Eyewear Device.
U.S. Appl. No. 18/544,781, filed Dec. 19, 2023, User Avatar Movement Control Using an Augmented Reality Eyewear Device.
"International Application Serial No. PCT/US2023/079099, International Preliminary Report on Patentability mailed May 22, 2025", 8 pgs.
"Korean Application Serial No. 10-2025-7018486, Notice of Preliminary Rejection mailed Mar. 23, 2026", w/ English translation, 17 pgs.

* cited by examiner

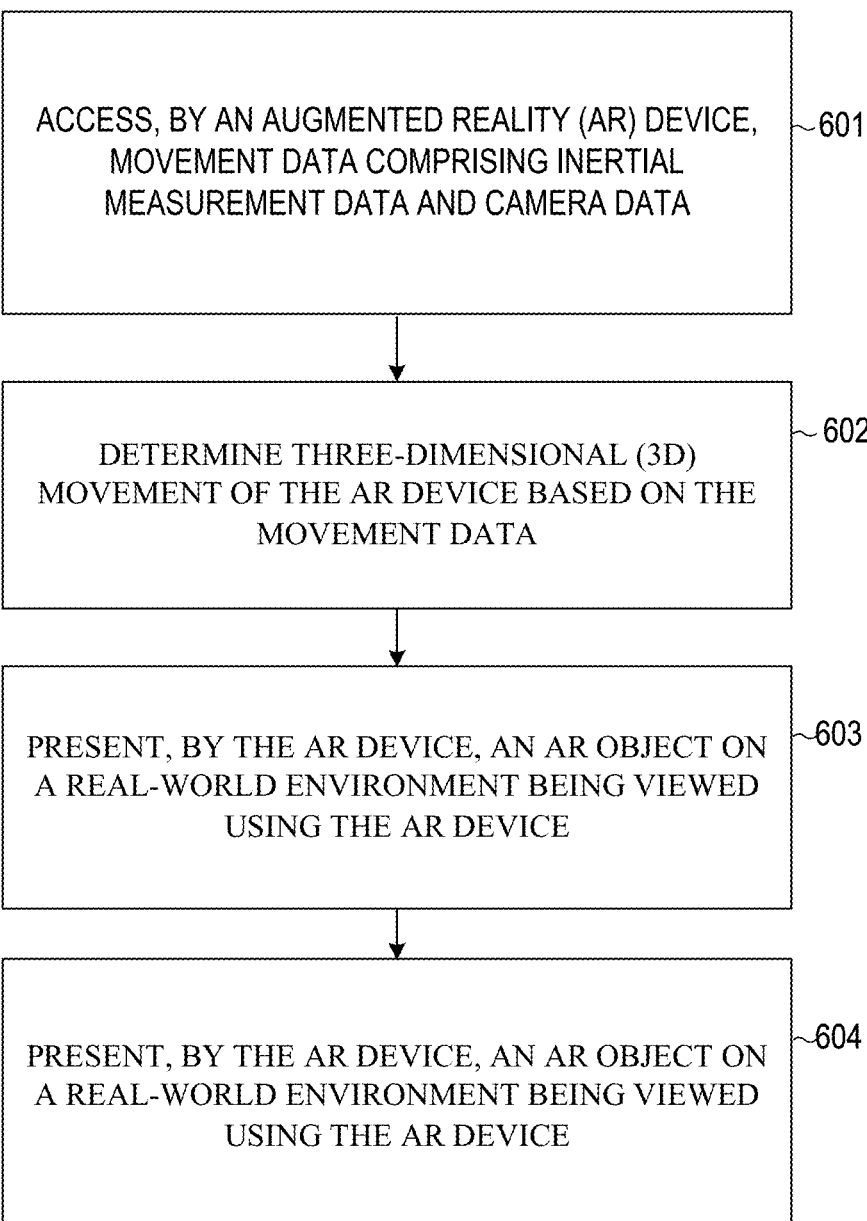

600

ACCESS, BY AN AUGMENTED REALITY (AR) DEVICE, MOVEMENT DATA COMPRISING INERTIAL MEASUREMENT DATA AND CAMERA DATA ~601

DETERMINE THREE-DIMENSIONAL (3D) MOVEMENT OF THE AR DEVICE BASED ON THE MOVEMENT DATA ~602

PRESENT, BY THE AR DEVICE, AN AR OBJECT ON A REAL-WORLD ENVIRONMENT BEING VIEWED USING THE AR DEVICE ~603

PRESENT, BY THE AR DEVICE, AN AR OBJECT ON A REAL-WORLD ENVIRONMENT BEING VIEWED USING THE AR DEVICE ~604

FIG. 6

USER AVATAR MOVEMENT CONTROL USING AN AUGMENTED REALITY EYEWEAR DEVICE

PRIORITY CLAIM

This application is a continuation of U.S. patent application Ser. No. 18/544,781, filed on Dec. 19, 2023, which is a continuation of U.S. patent application Ser. No. 17/983,040, filed on Nov. 8, 2022, each of which is hereby incorporated by reference in its entirety.

BACKGROUND

Some electronics-enabled eyewear devices, such as so-called smart glasses, allow users to interact with virtual content (e.g., augmented reality (AR) objects) while a user is engaged in some activity. Users wear the eyewear devices and can view a real-world environment through the eyewear devices while interacting with the virtual content that is displayed by the eyewear devices.

BRIEF DESCRIPTION OF THE DRAWINGS

Various ones of the appended drawings merely illustrate examples of the present disclosure and should not be considered as limiting its scope.

FIG. 6 is a flowchart showing example operations of the avatar control system, according to some examples.

DETAILED DESCRIPTION

Figure 1:
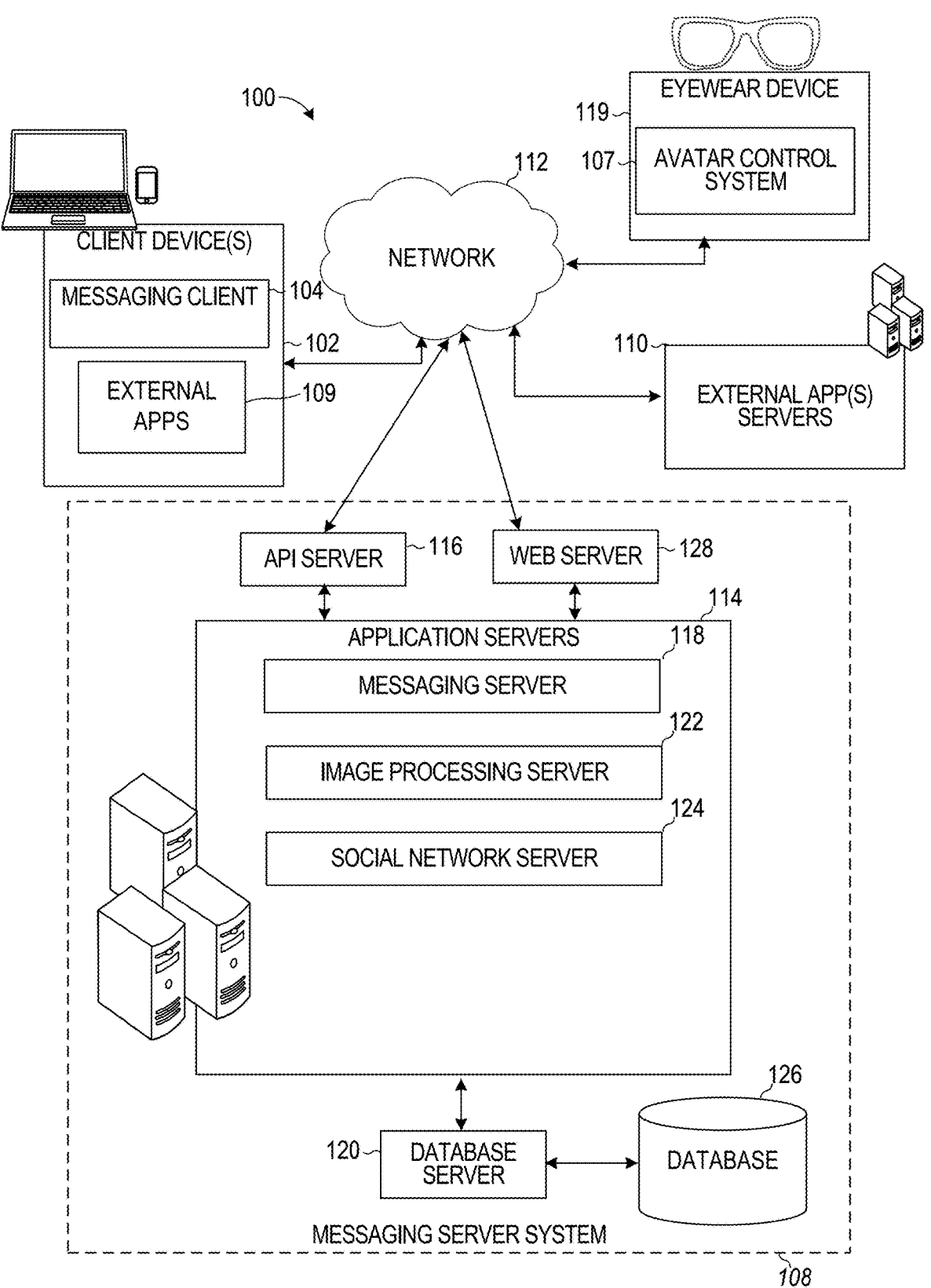
FIG. 1 is a diagrammatic representation of a networked environment in which the present disclosure may be deployed, in accordance with some examples.

The description that follows discusses illustrative examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Typical smart glasses platforms allow users to interact with various types of virtual content. Such platforms are configured to display the virtual content in the lenses of the smart glasses over a real-world environment seen through the lenses of the smart glasses. To interact with the virtual content, the smart glasses typically include an embedded sensor. The smart glasses can detect touch or swipe inputs based on the information detected by the embedded sensor and can then update a display of the virtual content. The interaction with the embedded sensor to perform various modifications of the virtual content is not very intuitive and has a very steep learning curve. As a result, users are unable to accurately perform various desired interactions with the virtual content which takes away from the overall experience of the user. Also, because of the steep learning curve, users typically have to re-perform certain actions multiple times until they learn how to use the sensors, which wastes resources of the smart glasses.

Certain smart glasses platforms use hand or gesture recognition to allow users to interact with the virtual content. Specifically, the smart glasses can detect hand gestures in images captured by the smart glasses and can perform corresponding modifications to the virtual content. Learning how to properly make such gestures also involves a steep learning curve and can also be non-intuitive. Also, performing image processing to detect hand gestures involves multiple machine learning models, which consumes a great deal of hardware resources of the smart glasses, which can be wasteful and drain the battery of the smart glasses. This can also lead to non-use of the smart glasses and takes away from the overall enjoyment of using the smart glasses.

The disclosed examples improve the efficiency of using the electronic device by providing an AR device that allows users to interact with virtual content or AR objects displayed by the AR device based on a physical movement of the user within a real-world environment. Specifically, the disclosed techniques access, by the AR device, movement data comprising inertial measurement data and camera data. The disclosed techniques determine three-dimensional (3D) movement of the AR device based on the movement data. The disclosed techniques present, by the AR device, an AR object on a real-world environment being viewed using the AR device. The disclosed techniques, in response to determining the 3D movement of the AR device, modify the AR object by the AR device. For example, a user wearing the AR device can jump, duck, run, or spin, and such movements are detected by the AR device. Based on detecting such movements, the AR device can animate an avatar or other virtual object to mimic the movement, such as by animating the avatar jumping, running, ducking, and/or spinning about its own axis.

In this way, the disclosed examples increase the efficiencies of the electronic device by reducing the amount of pages of information and inputs needed to accomplish a task and reducing running complex image processing algorithms on the AR device. The disclosed examples further increase the efficiency, appeal, and utility of electronic AR devices, such as eyewear devices. While the disclosed examples are provided within a context of electronic eyewear devices, similar examples can be applied to any other type of AR wearable device, such as an AR hat, an AR watch, an AR belt, an AR ring, an AR bracelet, AR earrings, and/or an AR headset.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

In some examples, the messaging system 100 includes an eyewear device 119, which hosts an avatar control system 107, among other applications. Any number of eyewear devices 119 can be included in the messaging system 100 although only one instance of the eyewear device 119 is shown.

The eyewear device 119 can represent any type of AR device that is worn by a user, such as AR glasses, an AR hat, an AR watch, an AR belt, an AR ring, an AR bracelet, AR earrings, and/or an AR headset. The eyewear device 119 is communicatively coupled to the client device 102 via the network 112 (which may include via a dedicated short-range communication path, such as a Bluetooth™ or WiFi direct connection).

The avatar control system 107 allows users to interact with virtual content or AR objects displayed by the eyewear device 119 based on movement data or 3D movement information determined by the eyewear device 119. The eyewear device 119 can access or collect movement data, such as inertial measurement unit data and image data obtained from a plurality of cameras of the eyewear device 119. The eyewear device 119 can determine 3D movement of the eyewear device 119 based on the movement data. In some cases, the eyewear device 119 can apply one or more machine learning models to the 3D movement to estimate a corresponding movement to apply to an AR object or avatar. The eyewear device 119 can then perform corresponding modifications to one or more displayed AR objects, such as animating an avatar to mimic the movement performed by the user and determined by the eyewear device 119.

In some examples, the avatar control system 107 accesses, by the AR device (e.g., eyewear device 119), movement data including inertial measurement data and camera data. The avatar control system 107 determines 3D movement of the AR device based on the movement data and presents, by the AR device, an AR object on a real-world environment being viewed using the AR device. The avatar control system 107, in response to determining the 3D movement of the AR device, modifies the AR object by the AR device.

In some examples, the movement data includes gyroscope data. In some examples, the AR device includes an AR eyewear device. The avatar control system 107 determines an orientation, rotation, location, and velocity in 3D space of the AR device as the 3D movement of the AR device. In some examples, the avatar control system 107 updates one or more body parts of an avatar based on the 3D movement of the AR device.

In some examples, the avatar control system 107 synchronizes the inertial measurement data with image data including the camera data obtained from a plurality of cameras. The avatar control system 107 corrects positional drift of the inertial measurement data in response to synchronizing the inertial measurement data with the image data. In some examples, the avatar control system 107 identifies an anchor object in the image data and periodically determines movement of a location of the anchor object in the image data. The avatar control system 107 synchronizes movement detected by the inertial measurement data with the movement of the location of the anchor object in the image data.

In some examples, the avatar control system 107 determines that the 3D movement of the AR device corresponds to movement in a particular direction. The avatar control system 107 moves the AR object along the particular direction in response to determining that the 3D movement of the AR device corresponds to the movement in the particular direction. In some examples, the particular direction includes at least one of forward, backward, left or right movement.

In some examples, the avatar control system 107 determines that the 3D movement of the AR device corresponds to movement in a particular speed. In such cases, the avatar control system 107 moves the AR object along a direction at the particular speed in response to determining that the 3D movement of the AR device corresponds to the movement in the particular speed. In some examples, the avatar control system 107 determines that the movement in the particular speed transgresses a threshold speed. In response to determining that the movement in the particular speed transgresses the threshold speed, the avatar control system 107 changes a movement style of the AR object from a first movement style to a second movement style. In some examples, the first movement style includes walking and the second movement style includes running, sprinting or flying.

In some examples, the avatar control system 107 determines that the 3D movement of the AR device corresponds to movement in a particular vertical height. The avatar control system 107 moves the AR object along the particular vertical height in response to determining that the 3D movement of the AR device corresponds to the movement in the particular vertical height. In some examples, the avatar control system 107 determines that the movement in the particular vertical height transgresses a threshold height and a threshold rate at which the particular vertical height is reached. In response to determining that the movement in the particular vertical height transgresses the threshold height and the threshold rate at which the particular vertical height is reached, the avatar control system 107 selects a movement style of the AR object. In some cases, the movement style includes jumping or ducking.

In some examples, the avatar control system 107 determines that the movement in the particular vertical height transgresses the threshold height and fails to transgress the threshold rate. In response to determining that the movement in the particular vertical height transgresses the threshold height and fails to transgress the threshold rate, the avatar control system 107 prevents application of the selected movement style to the AR object.

In some examples, the avatar control system 107 determines that the 3D movement of the AR device corresponds to a 360-degree spin along a specified curve. The avatar control system 107 rotates the AR object along an axis in response to determining that the 3D movement of the AR device corresponds to the 360-degree spin along the specified curve.

In some examples, the AR device is configured to apply one or more machine learning models to at least one of the 3D movement or the movement data to estimate a modification to apply to the AR object. In some examples, the AR object includes an avatar representing a user. In such cases, the avatar control system 107 determines an exercise goal associated with a fitness activity and animates the avatar to represent achievement of the exercise goal based on the determined 3D movement of the AR device.

A messaging client 104 can communicate and exchange data with other messaging clients 104, the eyewear device 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding augmented reality experience. Launching the AR experience includes obtaining one or more augmented reality items associated with the AR experience and overlaying the augmented reality items on top of the images or video being presented.

Figure 3:
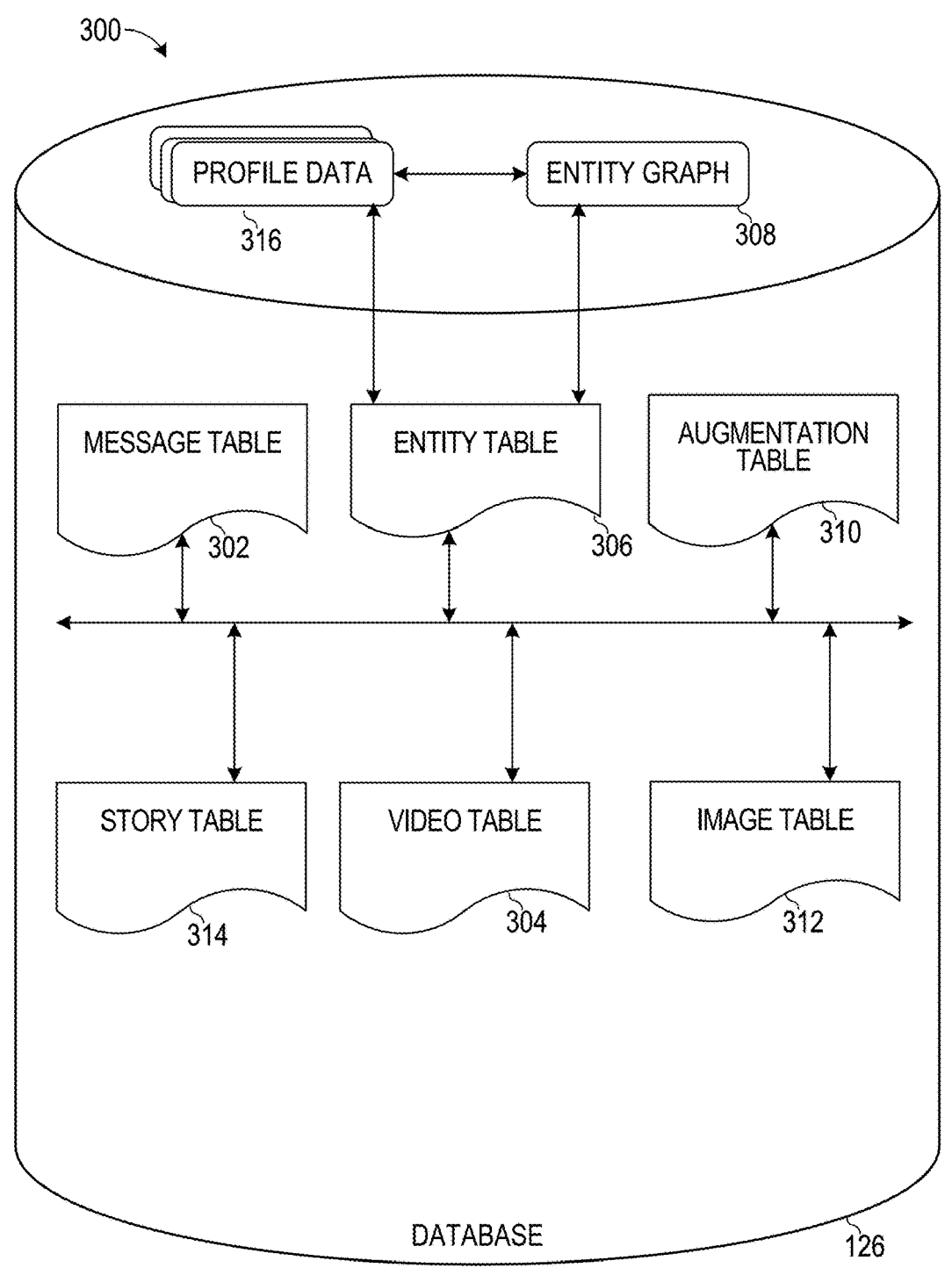
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
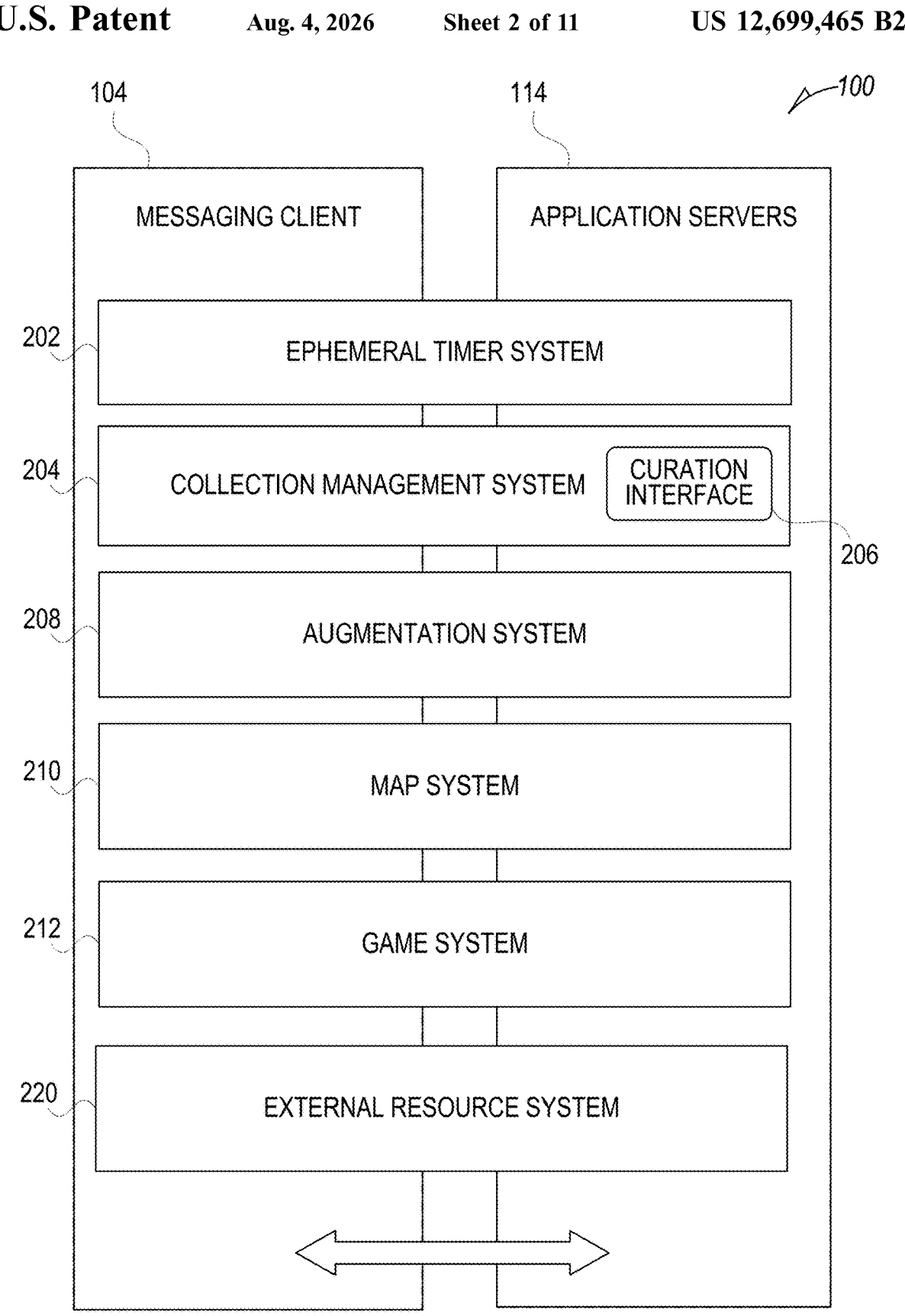
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
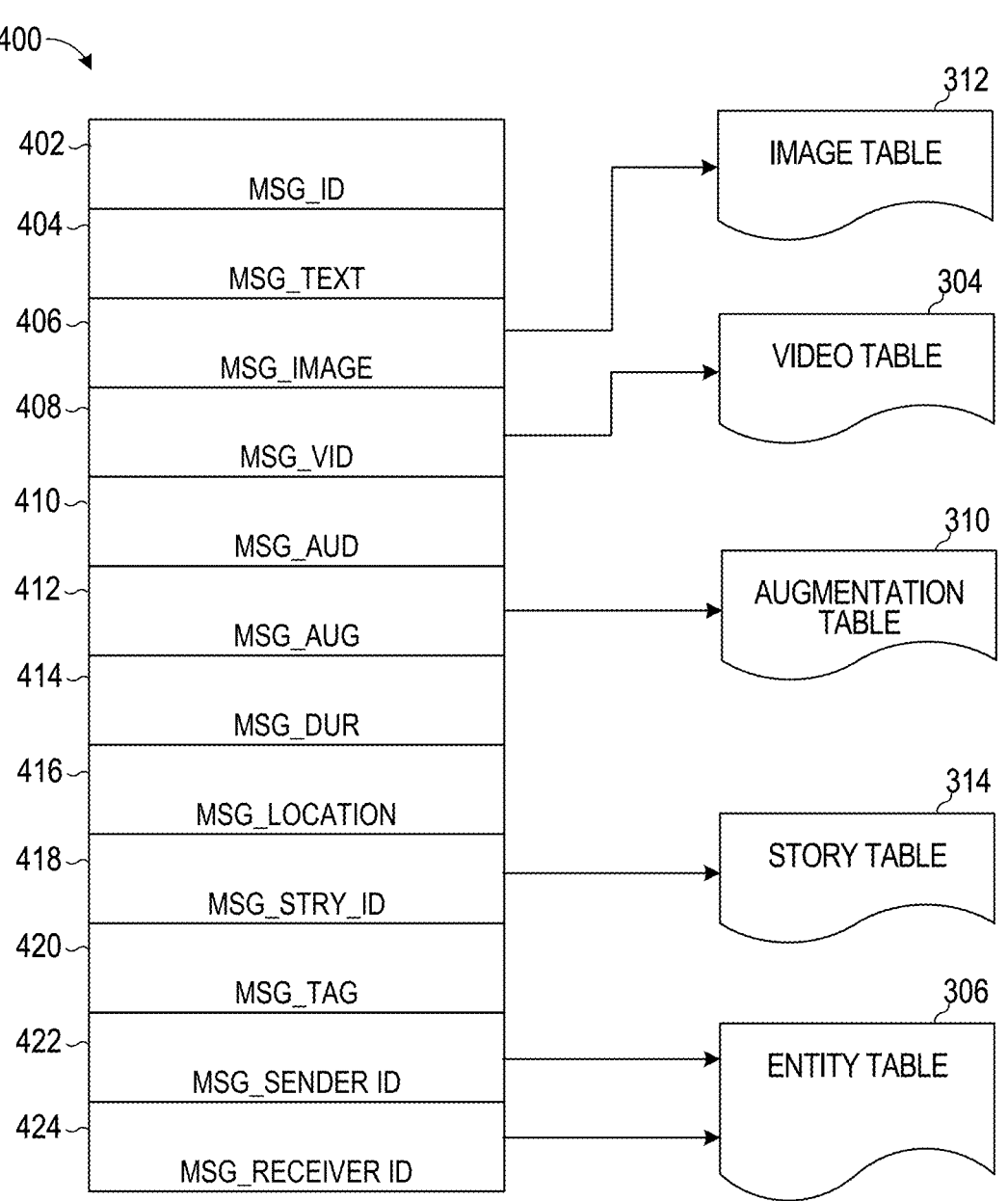
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400;

message text payload 404: text, to be generated by a user via a user interface of the client device 102, and that is included in the message 400;

message image payload 406: image data, captured by a camera component of a client device 102 or retrieved from a memory component of a client device 102, and that is included in the message 400. Image data for a sent or received message 400 may be stored in the image table 312;

message video payload 408: video data, captured by a camera component or retrieved from a memory component of the client device 102, and that is included in the message 400. Video data for a sent or received message 400 may be stored in the video table 304;

message audio payload 410: audio data, captured by a microphone or retrieved from a memory component of the client device 102, and that is included in the message 400;

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310;

message duration parameter 414: parameter value indicating, in seconds, the amount of time for which content of the message (e.g., the message image payload 406, message video payload 408, message audio payload 410) is to be presented or made accessible to a user via the messaging client 104;

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408);

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values;

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition;

message sender identifier 422: an identifier (e.g., a messaging system identifier, email address, or device identifier) indicative of a user of the client device 102 on which the message 400 was generated and from which the message 400 was sent; and message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Eyewear Device

Figure 5:
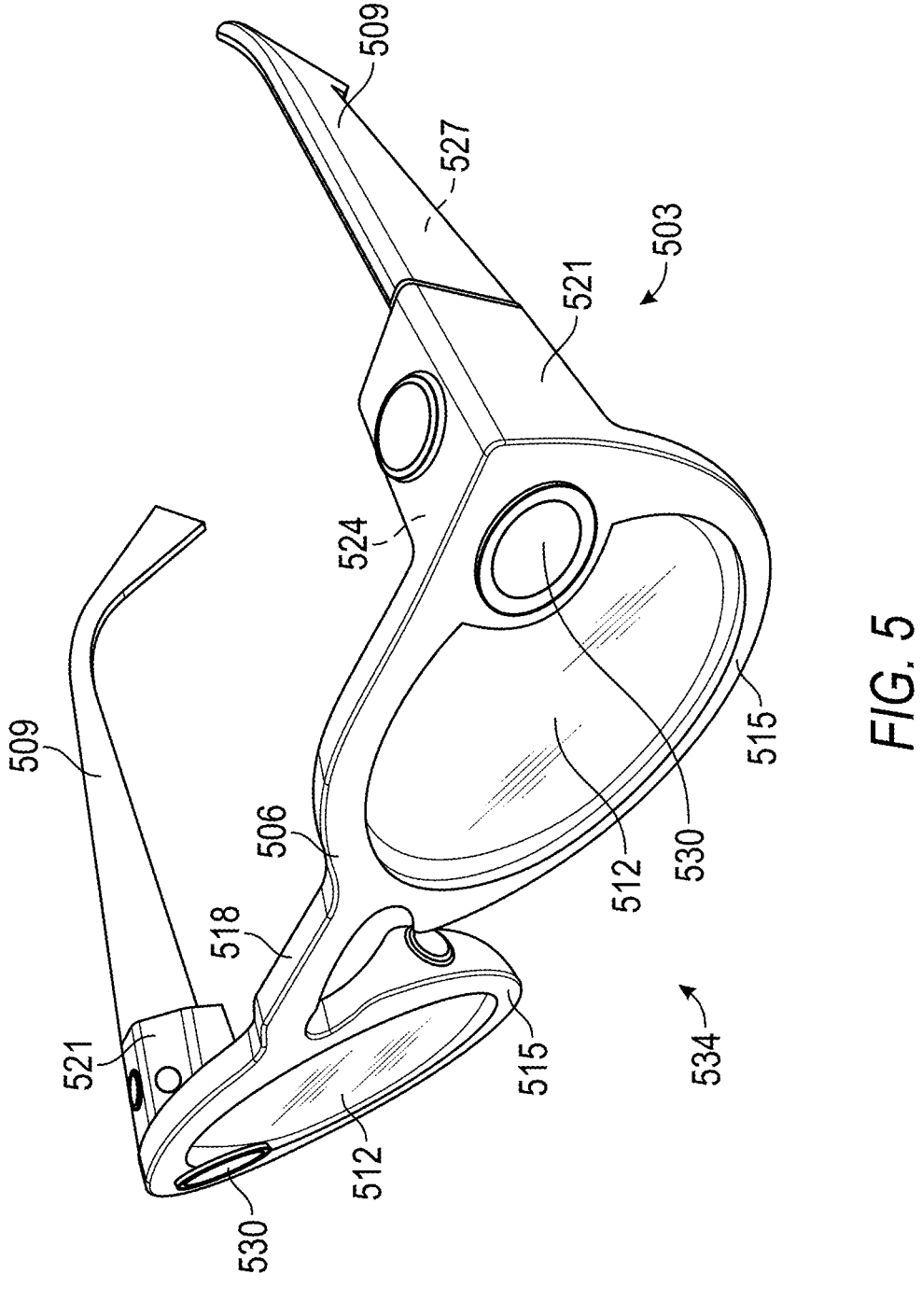
FIG. 5 is a perspective view of an eyewear device, according to some examples.

FIG. 5 shows a front perspective view of an eyewear device 119 in the form of a pair of smart glasses that include an avatar control system 107 according to some examples. The eyewear device 119 includes a body 503 comprising a front piece or frame 506 and a pair of temples 509 connected to the frame 506 for supporting the frame 506 in position on a user's face when the eyewear device 119 is worn. The frame 506 can be made from any suitable material such as plastics or metal, including any suitable shape memory alloy. The frame 506 can include a touch input interface that is configured to receive touch input from a user (e.g., one finger touch, two finger touch, or combination thereof together with dragging the finger(s) along the frame 506, such as lateral end pieces 521).

The eyewear device 119 includes a pair of optical elements in the form of a pair of lenses 512 held by corresponding optical element holders in the form of a pair of rims 515 forming part of the frame 506. The rims 515 are connected by a bridge 518. In other examples, one or both of the optical elements can be a display, a display assembly, or a lens and display combination.

The frame 506 includes a pair of end pieces 521 defining lateral end portions of the frame 506. In this example, a variety of electronics components are housed in one or both of the end pieces 521. The temples 509 are coupled to the respective end pieces 521. In this example, the temples 509 are coupled to the frame 506 by respective hinges so as to be hingedly movable between a wearable mode and a collapsed mode in which the temples 509 are pivoted towards the frame 506 to lie substantially flat against it. In other examples, the temples 509 can be coupled to the frame 506 by any suitable means, or can be rigidly or fixedly secured to the frame 506 so as to be integral therewith.

Each of the temples 509 includes a front portion that is coupled to the frame 506 and any suitable rear portion for coupling to the ear of the user, such as the curves illustrated in the example of FIG. 5. In some examples, the frame 506 is formed of a single piece of material, so as to have a unitary or monolithic construction. In some examples, the whole of the body 503 (including both the frame 506 and the temples 509) can be of the unitary or monolithic construction.

The eyewear device 119 has onboard electronics components including a computing device, such as a computer 524, or low power processor, which can in different examples be of any suitable type so as to be carried by the body 503. In some examples, the computer 524 is at least partially housed in one or both of the temples 509. In the present example, various components of the computer 524 are housed in the lateral end pieces 521 of the frame 506. The computer 524 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 524 comprises low-power circuitry, high-speed circuitry, and, in some examples, a display processor. Various examples may include these elements in different configurations or integrated together in different ways.

The computer 524 additionally includes a battery 527 or other suitable portable power supply. In one example, the battery 527 is disposed in one of the temples 509. In the eyewear device 119 shown in FIG. 5, the battery 527 is shown as being disposed in one of the end pieces 521, being electrically coupled to the remainder of the computer 524 housed in the corresponding end piece 521.

The eyewear device 119 is camera-enabled, in this example comprising a plurality of cameras 530 mounted in one of the end pieces 521 and facing forwards so as to be aligned more or less with the direction of view of a wearer of the eyewear device 119. The plurality of cameras 530 are configured to capture digital images (also referred to herein as digital photographs or pictures) as well as digital video content. Operation of the plurality of cameras 530 is controlled by a camera controller provided by the computer 524, image data representative of images or video captured by the plurality of cameras 530 being temporarily stored on a memory forming part of the computer 524.

The onboard computer 524 and the lenses 512 are configured together to provide the avatar control system 107, which presents an avatar of a user engaged in an AR session alone or with other users and animates the avatar based on movement information associated with the user determined by the eyewear device 119. Specifically, the lenses 512 can display virtual content, such as AR objects including the avatars of the users engaged in the AR session together with one or more real-world objects of a real-world environment. This makes it appear to the user that the virtual content is integrated within the real-world environment that the user views through the lenses 512.

In some examples, the virtual content is received from the client device 102. In some examples, the virtual content is received directly from the application servers 114. The onboard computer 524 receives input from the user that drags or moves the avatars into a particular display position. The input can indicate whether the display position is anchored to a particular real-world object. In such cases, as the lenses 512 are moved to view a different portion of the real-world environment, the avatars remain fixed in display positions to the particular real-world object and can be removed from view if the lenses 512 are turned or moved a sufficient distance away from the display position of the avatars. In some examples, the display position is not anchored, in which cases as the lenses 512 are moved to view different portions of the real-world environment, the avatar display positions are also updated to remain within view. This allows the user to move about their surroundings and consistently and continuously see the avatars of the users with whom the user is engaged in a voice-based conversation.

The eyewear device 119 includes one or more inertial measurement units (IMUs), such as an accelerometer and/or gyroscope and a touch interface. Based on input received by the eyewear device 119 from the IMUs and/or a touch interface, the eyewear device 119 can control user interaction with the virtual content. The IMUs can be used to determine movement, rotation, velocity, direction, and an orientation of a head of a wearer to generate 3D movement information for an avatar of the wearer or some other virtual object that is included and displayed by the eyewear device 119.

The 3D movement information can represent head movement, facial feature movement, limb, joints and/or other body movements. The movement information can be used by the eyewear device 119 for controlling one or more avatars presented in the lenses of the eyewear device 119. For example, if the movement information indicates movement along a particular direction and/or at a particular speed that transgresses a threshold, such movement information can then be used to cause or animate a displayed avatar to be animated as running instead of walking along the same particular direction. As another example, if the movement information indicates a vertical acceleration that transgresses a threshold acceleration or speed and a vertical displacement or height that transgresses a threshold amount, the movement information can then be used to cause or animate a displayed avatar to be animated as jumping or ducking. As another example, if the movement information indicates a 360 degree spin along a specified curve, the movement information can then be used to cause or animate a displayed avatar to be animated as rotating about an axis, such as to simulate a summersault.

The eyewear device 119 further includes one or more communication devices, such as Bluetooth low energy (BLE) communication interface. Such BLE communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol, the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then can be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some examples, the client device 102 communicates with the eyewear device 119 using the first protocol and/or second protocol to exchange images or videos or virtual content between the messaging client 104 and the eyewear device 119.

Avatar Control System

FIG. 6 is a flowchart illustrating example operations of the avatar control system 107 in performing a process 600, according to some examples. The process 600 may be embodied in computer-readable instructions for execution by one or more processors such that the operations of the process 600 may be performed in part or in whole by the functional components of the avatar control system 107; accordingly, the process 600 is described below by way of example with reference thereto. However, in other examples, at least some of the operations of the process 600 may be deployed on various other hardware configurations. The process 600 is therefore not intended to be limited to the avatar control system 107 and can be implemented in whole, or in part, by any other component. Some or all of the operations of process 600 can be in parallel, out of order, or entirely omitted.

At operation 601, the avatar control system 107 accesses, by the AR device, movement data comprising inertial measurement data and camera data, as discussed above and below.

At operation 602, the avatar control system 107 determines three-dimensional (3D) movement of the AR device based on the movement data, as discussed above and below.

At operation 603, the avatar control system 107 presents, by the AR device, an AR object on a real-world environment being viewed using the AR device, as discussed above and below.

At operation 604, the avatar control system 107, in response to determining the 3D movement of the AR device, modifies the AR object by the AR device, as discussed above and below.

Figure 7:
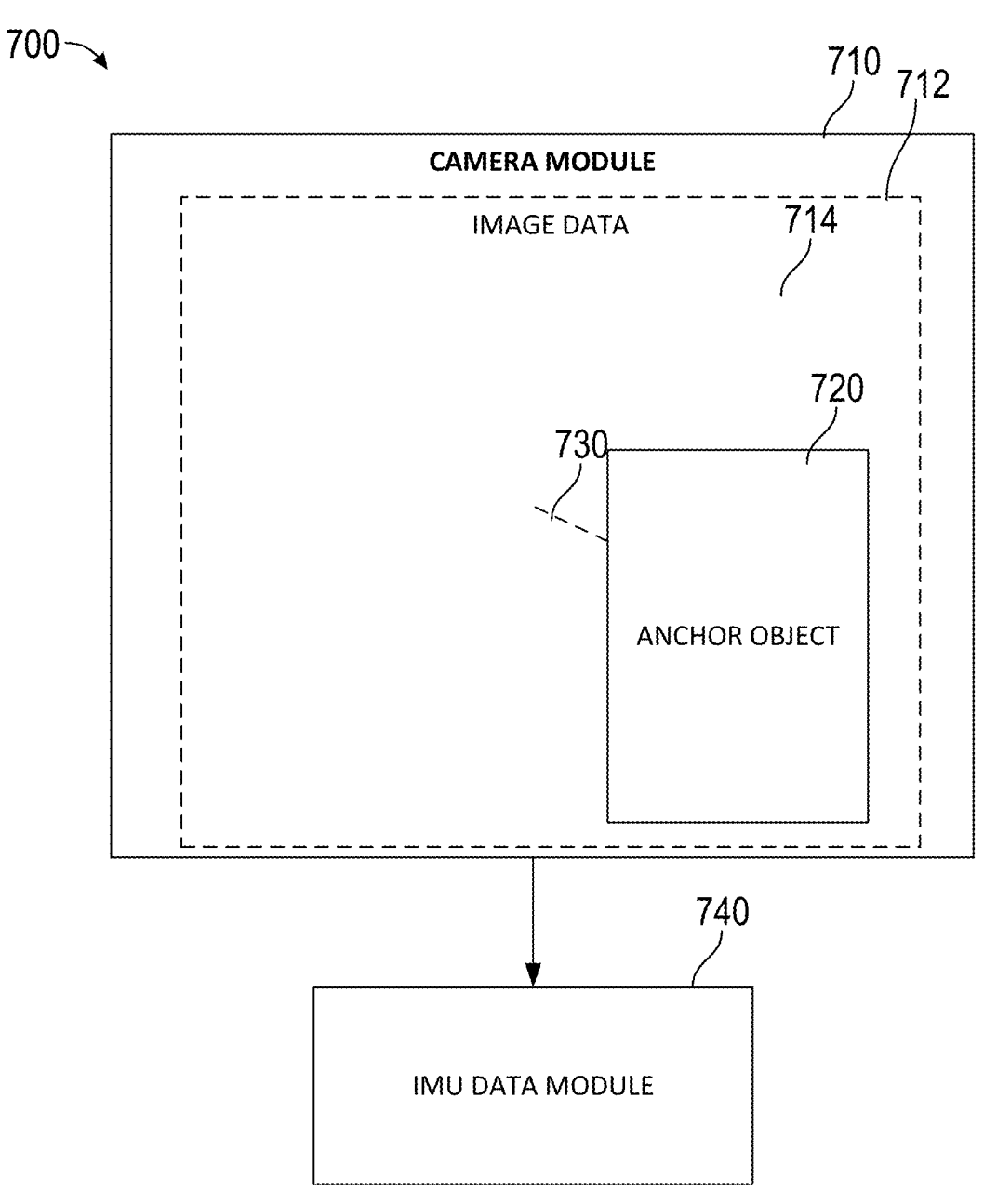
FIGS. 7-9 are illustrative screens and modules of the avatar control system, according to some examples.
Figure 8:
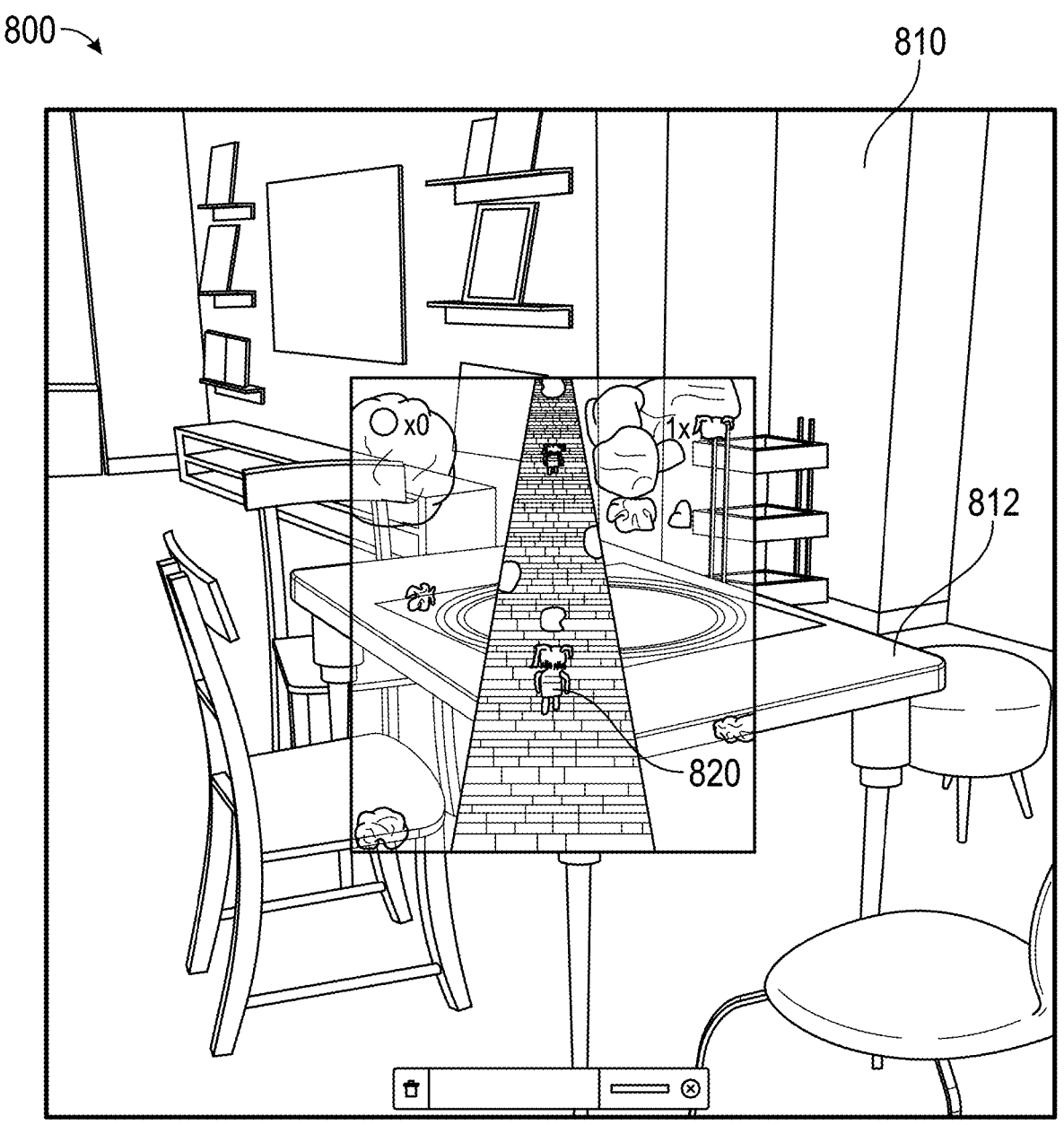
Figure 9:
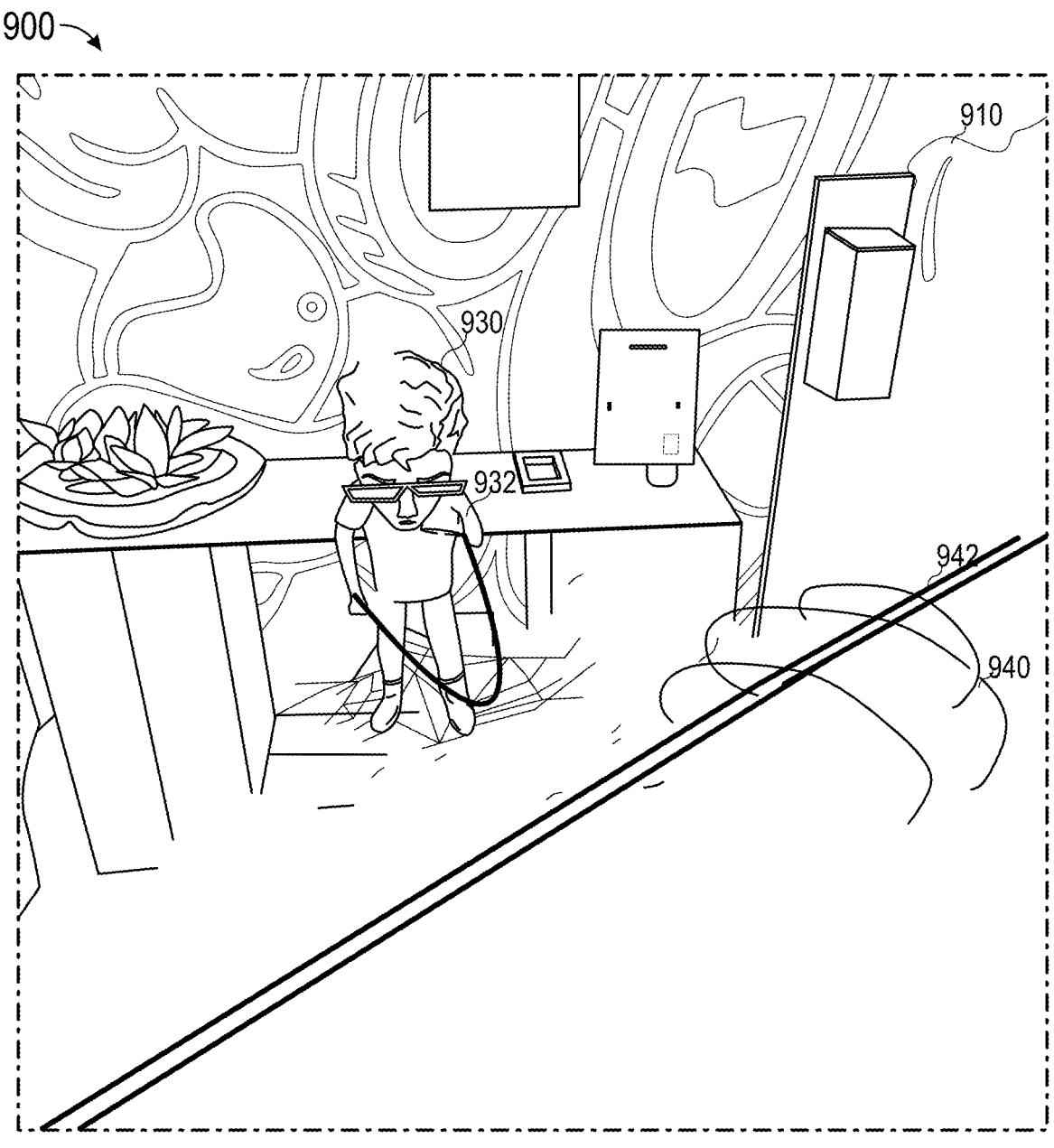

FIGS. 7-9 are illustrative screens and components of the avatar control system 107 according to some examples. In some examples, the avatar control system 107 captures multiple types of data from sensors of the eyewear device 119. For example, the avatar control system 107 can collect a plurality of images from a plurality of cameras of the eyewear device 119. The avatar control system 107 can segment one or more real-world objects in the images using one or more trained machine learning models. The avatar control system 107 can then select an anchor object to use to remove jitter and correct positional drift of other non-vision based sensors.

Specifically, as shown in the set of components 700, the avatar control system 107 can accurately measure 3D movement of the eyewear device 119 based on a combination of measurements collected from multiple types of sensors. For example, the avatar control system 107 can include a camera module 710 and an IMU data module 740. The camera module 710 can collect image data 712 that depicts a real-world environment 714. The avatar control system 107 can process the image data 712 to identify one or more real-world objects. The avatar control system 107 can select a given one of the real-world objects to use as an anchor object 720. In some cases, the avatar control system 107 selects the given one of the real-world objects based on size and/or movement of each real-world object. Namely, the avatar control system 107 can select, as the anchor object 720, the largest real-world object and/or the real-world object that moves the least amount across a set of video frames.

After the anchor object 720 is selected, the avatar control system 107 periodically or continuously measures displacement 730 of the anchor object 720. The avatar control system 107 converts the displacement 730 into a 3D displacement, such as in a 3D coordinate system. The avatar control system 107 provides the displacement 730 to the IMU data module 740. The avatar control system 107 collects or obtains 3D displacement information from the IMU data module 740. The avatar control system 107 can synchronize the IMU data module 740 with the camera module 710 based on a comparison of the 3D displacement information obtained from the IMU data module 740 and the 3D displacement determined from the displacement 730. In response to determining that the 3D displacement information obtained from the IMU data module 740 fails to match within a specified threshold the 3D displacement determined from the displacement 730 based on the image data 712, the avatar control system 107 updates the 3D displacement computations generated by the IMU data module 740 to match that determined by the image data 712. In this way, the avatar control system 107 can accurately determine 3D movement of the eyewear device 119 and can correct positional drift of inertial measurement data obtained by the IMU data module 740.

The eyewear device 119 can generate 3D movement information based on movement data collected by the camera module 710 and the IMU data module 740. The eyewear device 119 can convert the 3D movement information into a corresponding modification or movement of an AR object displayed by the eyewear device 119. In some cases, the eyewear device 119 can apply one or more machine learning models to the 3D movement information to interpret and/or select a particular type of modification and/or movement to apply to the AR object.

The machine learning model can be trained using labeled or unlabeled training data that includes ground-truth information. For example, one or more types of 3D movement can be included in the training data along with the ground-truth modification made to the AR object. The machine learning model can be applied to a subset of the training data, such as one or more types of 3D movement in the training data, and can generate an estimate or prediction about the modification to apply to the AR object. The estimate or prediction can be compared with the corresponding ground-truth information to compute a deviation. The deviation can then be used to update one or more parameters of the machine learning model. After updating the one or more parameters, the machine learning model is applied to another subset of the training data and these operations are repeated until a stopping criterion is reached. This allows the eyewear device 119 to be trained to accurately distinguish 3D movement corresponding to a ducking movement versus 3D movement corresponding to a sitting movement when the 3D movement data for such 3D movements can be very similar.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example.

The machine-learning algorithms use the training data to find correlations among the identified features that affect the outcome or assessment. In some examples, the training data includes labeled data, which is known data for one or more identified features and one or more outcomes, such as detecting communication patterns, detecting the meaning of the message, generating a summary of a message, detecting action items in messages detecting urgency in the message, detecting a relationship of the user to the sender, calculating score attributes, calculating message scores, detecting a modification to apply to an avatar based on 3D movement of a device, etc.

With the training data and the identified features, the machine-learning tool is trained at machine-learning program training. The machine-learning tool appraises the value of the features as they correlate to the training data. The result of the training is the trained machine-learning program.

When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised learning, unsupervised or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing query data to generate outcomes or predictions, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as individual measurable property of a process, article, system, or phenomenon represented by a data set (e.g., the training data).

In training phases, the machine-learning program uses the training data to find correlations among the features that affect a predicted outcome or assessment.

With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a deep neural network that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), a Generative Adversarial Network (GAN), and/or a Recursive Neural Network (RNN), merely for example.

During prediction phases, the trained machine-learning program is used to perform an assessment. Query data is provided as an input to the trained machine-learning program, and the trained machine-learning program generates the assessment as output, responsive to receipt of the query data.

Based on the 3D movement information determined by the eyewear device 119, the eyewear device 119 can update an avatar of the user or an AR object. For example, the eyewear device 119 can animate an avatar that resembles a pose (positioning of the limbs and joints) of the user determined based on the movement information collected by the eyewear device 119. In such cases, if the user walks in a particular direction, the eyewear device 119 can animate the avatar to depict the avatar as walking in the same direction. For example, if the user walks forward, the avatar can be depicted as walking forward. Similarly, if the user walks backwards, the avatar can be depicted as walking backwards. Similarly, if the user walks to the left/right, the avatar can be depicted as walking to the left/right.

In some cases, the eyewear device 119 can interpret the 3D movement as transgressing a particular speed. For example, the eyewear device 119 can determine that the eyewear device 119 has been displaced along a particular direction at a particular speed. The eyewear device 119 can compare the speed or rate to a threshold speed. In response to determining that the speed or rate at which the eyewear device 119 is displayed transgresses the threshold or exceeds the threshold, the eyewear device 119 can animate the avatar from having a first type of movement (e.g., walking) to having a second type of movement (e.g., running or sprinting or flying). The eyewear device 119 can later compare the speed or rate to a threshold speed, and in response to determining that the speed or rate at which the eyewear device 119 is displayed has now failed to transgress the threshold or exceeds the threshold, the eyewear device 119 can animate the avatar from having the second type of movement (e.g., running) back to having the first type of movement (e.g., walking).

In some cases, the eyewear device 119 can modify a mouse or pointer that is displayed as an AR object based on the 3D movement. For example, if the user is walking in a particular direction, the mouse or pointer can move along that direction to point to a real-world element or another AR object.

In some examples, the eyewear device 119 can detect that the 3D movement corresponds to vertical displacement. The eyewear device 119 can determine the rate at which the vertical displacement exceeds or transgresses a threshold rate. In response, the eyewear device 119 interprets the 3D movement as a jumping action and modifies the AR object to animate or perform a jumping action. For example, the eyewear device 119 can determine that the vertical displacement is increased by an amount that exceeds a jumping threshold amount. In such cases, the eyewear device 119 interprets the 3D movement as a jumping action. As another example, the eyewear device 119 can determine that the vertical displacement is decreased by an amount that exceeds a ducking threshold amount. In such cases, the eyewear device 119 interprets the 3D movement as a ducking action. If the eyewear device 119 detects the vertical displacement but determines that the vertical displacement occurs at a rate that fails to exceed or transgress the threshold rate (e.g., the user is climbing up a flight of stairs and is not jumping), the eyewear device 119 maintains the AR object in its current form without modifying a movement style of the avatar (preventing the avatar from being depicted as jumping in place).

For example, as shown in the user interface 800 of FIG. 8, an avatar 820 is presented in a real-world environment 810 that is being viewed by a user using the eyewear device 119. The real-world environment 810 can include one or more real-world objects 812. In response to capturing and computing 3D movement of the eyewear device 119, the eyewear device 119 updates a whole body of the avatar 820 that is presented as an overlay on the real-world environment 810.

Specifically, the avatar 820 can be presented together with other virtual objects that are part of the AR experience that is being animated. The avatar 820 can be a runner that is running down a path a virtual road. Virtual objects (e.g., virtual obstacles) can continuously be animated as approaching the avatar 820. The user who is wearing or using the eyewear device 119 can move their body (left, right, up, down, ducking, jumping, and so forth) to try to avoid or capture or collect the virtual objects. For example, the user who is wearing or using the eyewear device 119 can lean or walk to the left by a certain amount of degrees and at a certain velocity or speed. In response, the eyewear device 119 can capture 3D movement data corresponding to that movement and update an orientation and/or position of the avatar 820 to mimic the same movement. A score can be maintained by the eyewear device 119 based on a quantity of virtual objects that the avatar 820 has successfully avoided and/or collected. The score can be displayed by a visual representation on the lenses of the eyewear device 119.

In some examples, the eyewear device 119 can be used to run or execute a fitness activity application, such as weightlifting, running, stairclimbing, yoga, jump rope, and so forth. In such cases, the eyewear device 119 can present a user interface 900 shown in FIG. 9 that includes a fitness avatar 930 over a real-world environment 910. While a user is wearing the eyewear device 119 and performing a fitness activity (e.g., jumping rope), the eyewear device 119 can present an indication of how close or far the user is to achieving a fitness goal. The eyewear device 119 can collect or determine 3D movement information using the plurality of on-board sensors of the eyewear device 119 and, in response to determining the 3D movement information, the eyewear device 119 updates a whole body of the avatar 930 that is presented as overlaid on the real-world environment 910. The eyewear device 119 can receive input from the user directly on the eyewear device 119 (or indirectly from the client device 102) moving or positioning the fitness avatar 930 in a specified location or position in 3D space.

The eyewear device 119 moves the avatar 930 in a similar manner as the interpreted 3D movement of the user based on the 3D movement information determined by the eyewear device 119. For example, if the 3D movement information is interpreted to indicate that a limb 940 of the user has been moved up by a certain amount and that the user has jumped up by a certain amount, the eyewear device 119 updates the limb 932 of the avatar 930 as moving up the same amount and updates legs and orientation of the avatar 930 to perform a jump action as well as updating the virtual rope being held by the avatar 930. In some cases, the eyewear device 119 can access data of the fitness application to identify one or more goals of the fitness activity. For example, the goal can include performing one or more repetitions, iterations, or reps of a certain fitness activity. In such cases, the data can specify that movement of a specified limb 932 of the avatar 930 in a particular direction and jumping a certain quantity of times until reaching a certain level or threshold corresponds to completion of a single repetition, iteration or rep of the fitness activity. The eyewear device 119 can track how many times the avatar 930 has performed the jumping action for jumping rope by updating a counter each time the limb 932 and/or the avatar 930 is animated to perform the jumping rope activity in response to the interaction data received from the real-world mobile device 920. The counter can be presented on a screen or lenses of the eyewear device 119 to allow the user to track their progress through the fitness activity.

In some cases, the fitness activity goal can correspond to maintaining a pose for a certain period of time or threshold period of time. In such cases, the eyewear device 119 can track how many times the limb 932 has been raised to the certain level or threshold and held in that position for the threshold period of time by updating a counter each time the limb 932 is animated to reach the certain level or threshold and held for the certain threshold period of time in response to the interaction data received from the real-world mobile device 920. For example, the eyewear device 119 can determine when the avatar 930 is performing a predetermined pose (by matching limbs of the avatar 930 to a predetermined configuration of limbs) that matches a pose represented by the interaction data generated by and received from the real-world mobile device 920. In response to determining that the avatar 930 is performing the pose that matches the predetermined pose, the eyewear device 119 can initiate a counter or timer. Once the counter or timer reaches a certain threshold indicating that the pose has been held by the user for the threshold period of time, the eyewear device 119 updates the iteration counter or repetition counter to indicate that one complete iteration of the fitness activity has been performed or completed. The iteration counter can be presented on a screen or lenses of the eyewear device 119 to allow the user to track their progress through the fitness activity.

The eyewear device 119 can determine that the movement information corresponds to jumping actions, such as when the user is doing a jump rope fitness activity. The eyewear device 119 can count how many times the jumping actions take place within a given interval of time and can update a color of the avatar 930 to represent how close or far the user is to achieving a desired goal (specifying a quantity of jumps within a given interval).

Machine Architecture

Figure 10:
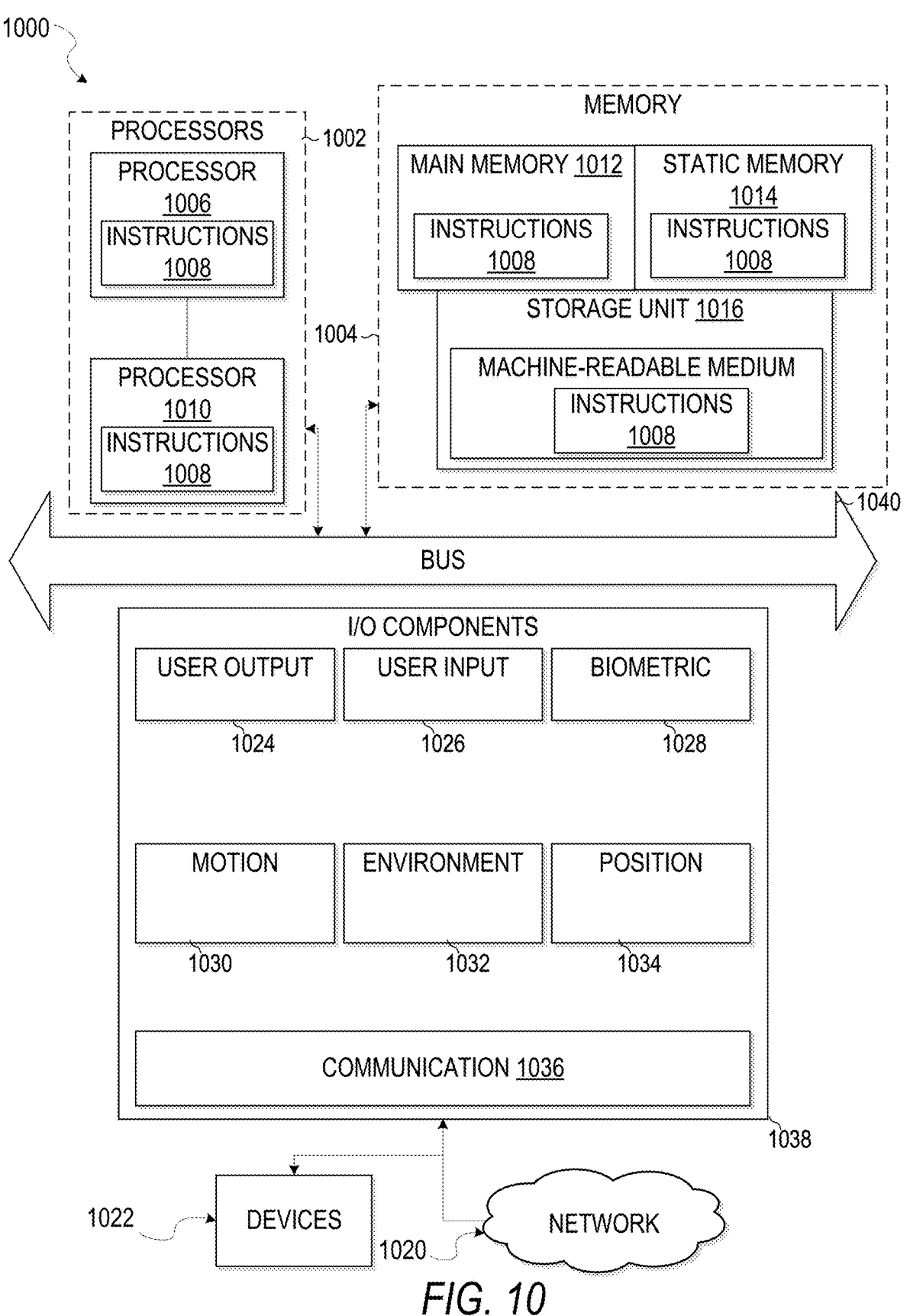
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
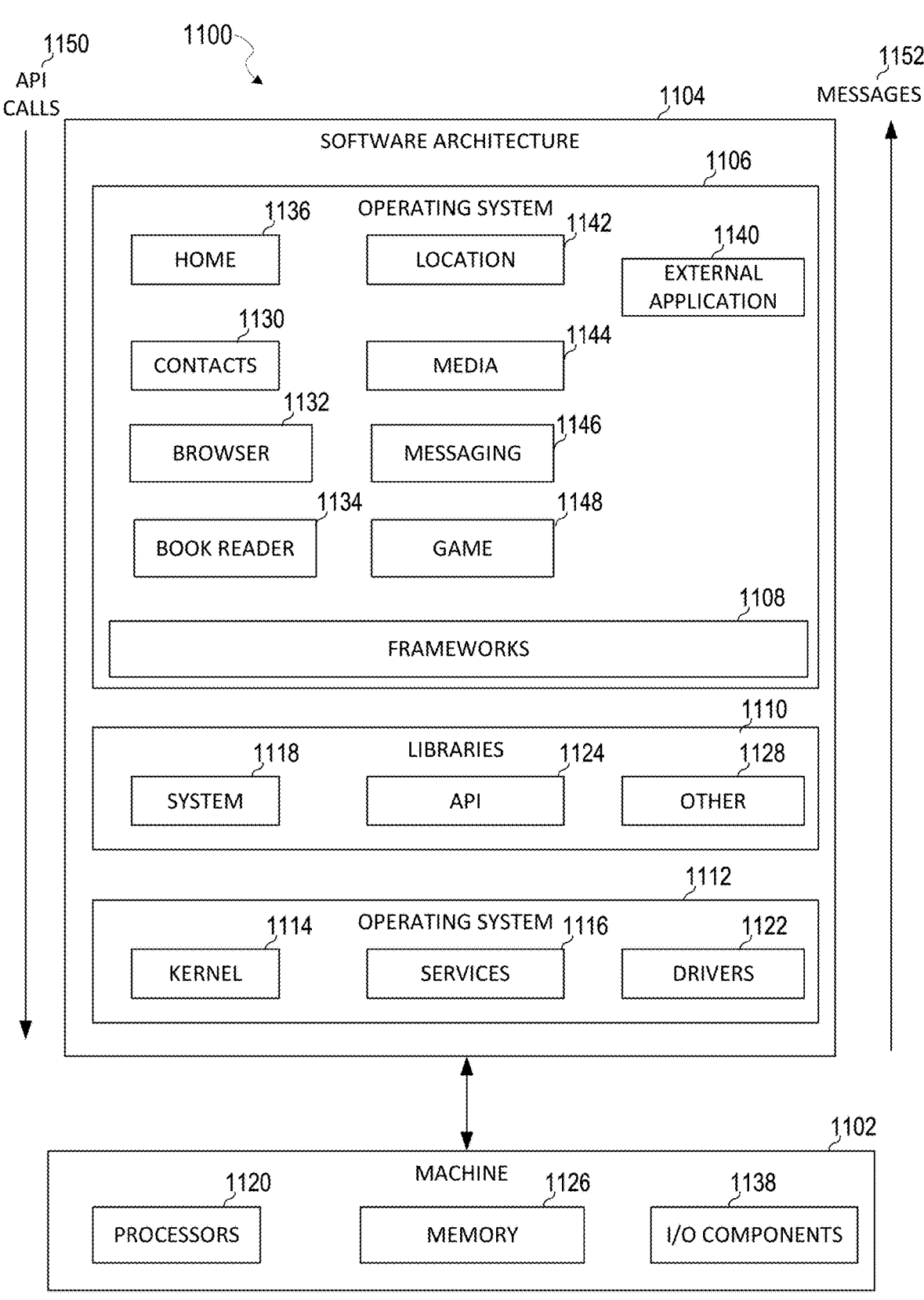
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOST, ANDROID™, WINDOWS® Phone, or another mobile operating system. In this example, the external application 1140 can invoke the API calls 1150 provided by the operating system 1112 to facilitate functionality described herein.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

MODULES, COMPONENTS, AND LOGIC

Certain examples are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various examples, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some examples, the processors or processor-implemented modules are located in a single geographic location (e.g., within a home environment, an office environment, or a server farm). In other examples, the processors or processor-implemented modules are distributed across a number of geographic locations.

What is claimed is:

1. A method comprising:

accessing, by an augmented reality (AR) device, movement data comprising inertial measurement data;

determining, based on the movement data, that a given movement of the AR device in a particular vertical height transgresses a threshold height and a threshold rate at which the particular vertical height is reached; and in response to determining that the given movement in the particular vertical height transgresses the threshold height and the threshold rate at which the particular vertical height is reached, selecting a movement style of an AR object.

2. The method of claim 1, further comprising:

determining three-dimensional (3D) movement of the AR device based on the movement data; and presenting, by the AR device, the AR object on a real-world environment being viewed using the AR device.

3. The method of claim 1, wherein the movement data comprises a specified degree of spin comprising a 360-degree of spin.

4. The method of claim 1, wherein the AR device comprises an AR eyewear device, further comprising:

determining an orientation, rotation, location, and velocity in 3D space of the AR device as the movement data of the AR device.

5. The method of claim 1, further comprising:

updating one or more body parts of an avatar based on the movement data.

6. The method of claim 1, further comprising:

synchronizing the inertial measurement data with image data comprising camera data obtained from a plurality of cameras; and correcting positional drift of inertial measurement data in response to synchronizing the inertial measurement data with the image data.

7. The method of claim 1, wherein the given movement includes at least one of forward, backward, left or right movement.

8. The method of claim 1, further comprising:

determining that the movement data corresponds to movement in a particular speed; and moving the AR object along a direction at the particular speed in response to determining that the movement data corresponds to the movement in the particular speed.

9. The method of claim 8, further comprising:

determining that the movement at the particular speed transgresses a threshold speed; and in response to determining that the movement at the particular speed transgresses the threshold speed, changing a movement style of the AR object from a first movement style to a second movement style.

10. The method of claim 9, wherein the first movement style comprises walking, and wherein the second movement style comprises running, sprinting or flying.

11. The method of claim 1, further comprising:

determining that the movement data transgresses the threshold height and fails to transgress the threshold rate; and in response to determining that the movement data in the particular vertical height transgresses the threshold height and fails to transgress the threshold rate, preventing application of a movement style to the AR object.

12. The method of claim 1, wherein the AR device is configured to apply one or more machine learning models to at least one of the movement data to estimate a modification to apply to the AR object.

13. The method of claim 1, wherein the AR object comprises an avatar representing a user, further comprising:

determining an exercise goal associated with a fitness activity; and animating the avatar to represent achievement of the exercise goal based on the movement data.

14. A system comprising:

at least one storage device of an augmented reality (AR) device; and at least one processor coupled to the at least one storage device and programmed to perform operations comprising:

accessing, by an augmented reality (AR) device, movement data comprising inertial measurement data;

determining, based on the movement data, that a given movement of the AR device in a particular vertical height transgresses a threshold height and a threshold rate at which the particular vertical height is reached; and in response to determining that the given movement in the particular vertical height transgresses the threshold height and the threshold rate at which the particular vertical height is reached, selecting a movement style of an AR object.

15. The system of claim 14, the operations comprising:

determining three-dimensional (3D) movement of the AR device based on the movement data; and presenting, by the AR device, the AR object on a real-world environment being viewed using the AR device.

16. The system of claim 14, wherein the movement data comprises a specified degree of spin comprising a 360-degree of spin.

17. The system of claim 14, wherein the AR device comprises an AR eyewear device, and wherein the operations comprise:

determining an orientation, rotation, location, and velocity in 3D space of the AR device as the movement data of the AR device.

18. A non-transitory machine-readable storage medium comprising instructions that, when executed by one or more processors of a machine, cause the machine to perform operations comprising:

accessing, by an augmented reality (AR) device, movement data comprising inertial measurement data;

determining, based on the movement data, that a given movement of the AR device in a particular vertical height transgresses a threshold height and a threshold rate at which the particular vertical height is reached; and in response to determining that the given movement in the particular vertical height transgresses the threshold height and the threshold rate at which the particular vertical height is reached, selecting a movement style of an AR object.

19. The non-transitory machine-readable storage medium of claim 18, the operations comprising:

determining three-dimensional (3D) movement of the AR device based on the movement data; and presenting, by the AR device, the AR object on a real-world environment being viewed using the AR device.

20. The non-transitory machine-readable storage medium of claim 18, wherein the movement data comprises a specified degree of spin comprising a 360-degree of spin.

* * * * *